US012798457B2

(12) United States Patent
Ha

(10) Patent No.: US 12,798,457 B2
(45) Date of Patent: Nov. 17, 2026

(54) EXTENDIBLE REAR SEAT ARMREST

(71) Applicant: GM GLOBAL TECHNOLOGY OPERATIONS LLC, Detroit, MI (US)

(72) Inventor: Mingip Ha, Incheon (KR)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 203 days.

(21) Appl. No.: 18/756,638

(22) Filed: Jun. 27, 2024

(65) Prior Publication Data

US 2026/0001464 A1 Jan. 1, 2026

(51) Int. Cl.
*B60N 2/75* (2018.01)

(52) U.S. Cl.
CPC .................................... *B60N 2/757* (2018.02)

(58) Field of Classification Search
CPC ...................................................... B60N 2/757
See application file for complete search history.

(56) References Cited

U.S. PATENT DOCUMENTS

| | | | | | |
|---|---|---|---|---|---|
| 5,947,554 | A * | 9/1999 | Mashkevich | B60N 2/793 | 297/216.13 |
| 6,328,384 | B1 * | 12/2001 | Yamauchi | B60N 2/753 | 297/411.32 |
| 2010/0148561 | A1 * | 6/2010 | Runde | B60N 2/757 | 74/105 |
| 2011/0316310 | A1 * | 12/2011 | Runde | B60N 2/757 | 297/411.3 |
| 2022/0242575 | A1 * | 8/2022 | Marutzky | B64D 11/0691 | |

FOREIGN PATENT DOCUMENTS

| | | | | |
|---|---|---|---|---|
| DE | 3505399 | A1 | 8/1986 | |
| DE | 102006010459 | B3 | 9/2007 | |
| DE | 102006011994 | A1 * | 2/2008 | B60N 2/77 |
| DE | 102006025083 | B4 * | 4/2012 | B60N 2/757 |
| DE | 102020202265 | A1 | 8/2021 | |

OTHER PUBLICATIONS

German Office Action from counterpart DE1020241236701, dated May 7, 2025.

* cited by examiner

*Primary Examiner* — David R Dunn
*Assistant Examiner* — Tania Abraham

(57) ABSTRACT

An extendible armrest for a seat structure includes a pivot plate configured to be fixed to the seat structure and having a pivot hole and a first curved pivot slot and a second curved pivot slot. An extension plate includes a pivot pin pivotally connecting the extension plate to the pivot plate and including a guide pin supported by the extension plate and received in the first curved pivot slot. The extension plate further includes a guide slot. An armrest supports a first guide pin received in the second curved pivot slot of the pivot plate and supporting a second guide pin received in the guide slot of the extension plate. The armrest assembly permits a folding type armrest that allows the armrest to move forward when unfolded so that the entire armrest surface can be utilized.

18 Claims, 2 Drawing Sheets

EXTENDIBLE REAR SEAT ARMREST

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to an extendible armrest for a vehicle rear seat.

Vehicle rear seats are commonly provided with a deployable armrest that is stored within a recess in the seat back. The armrests are typically mounted on a pivot pin that allow the armrest to pivotally move from the stowed position to a deployed position. The length of the armrest is limited by a height of the seat back and a usable portion of the armrest is recessed within the recess in the seat back. Accordingly, it is desirable to provide an armrest with increased functionality that does not require any change to the seatback design.

SUMMARY

According to an aspect of the present disclosure, an extendible armrest for a seat structure includes a pivot plate configured to be fixed to the seat structure and having a pivot hole and a first curved pivot slot and a second curved pivot slot. An extension plate includes a pivot pin pivotally connecting the extension plate to the pivot plate and including a guide pin supported by the extension plate and received in the first curved pivot slot. The extension plate further includes a guide slot. An armrest supports a first guide pin received in the second curved pivot slot of the pivot plate and supporting a second guide pin received in the guide slot of the extension plate.

According to a further aspect of the present disclosure, the armrest is pivotable from a stowed position to a first deployed position by moving the first guide pin along the second curved pivot slot of the pivot plate and moving the guide pin of the extension plate along the first curved pivot slot of the pivot plate.

According to a further aspect of the present disclosure, the armrest is extendible from the first deployed position to a second deployed position by moving the first guide pin along the second curved pivot slot and by moving the second guide pin of the armrest along the guide slot of the extension plate.

According to a further aspect of the present disclosure, the seat structure includes a recess in which the armrest is stowed.

According to a further aspect of the present disclosure, the first curved pivot slot extends along an arc that extends an arc angle θ of at least 90°.

According to a further aspect of the present disclosure, the second curved pivot slot extends along an arc that extends an arc angle θ of greater than 90°.

According to a further aspect of the present disclosure, the second curved pivot slot extends along an arc that extends an arc angle θ of at least 110°.

According to another aspect of the present disclosure, an extendible armrest for a seat structure includes a pivot mechanism configured to be fixed to the seat structure. An extension mechanism is pivotally connected to the pivot mechanism. An armrest is pivotally mounted to the pivot mechanism and is extendibly mounted to the extension plate. The armrest is pivotable from a stowed position to a first deployed position and extendible from the first deployed position to a second deployed position forward of the first deployed position.

According to a further aspect of the present disclosure, the pivot mechanism includes a pivot plate configured to be fixed to the seat structure and having a pivot hole and a first curved pivot slot and a second curved pivot slot.

According to a further aspect of the present disclosure, the extension mechanism includes an extension plate including a pivot pin pivotally connecting the extension plate to the pivot plate and including a guide pin supported by the extension plate and received in the first curved pivot slot, the extension plate further including a guide slot.

According to a further aspect of the present disclosure, the armrest supports a first guide pin received in the second curved pivot slot of the pivot plate and supports a second guide pin received in the guide slot of the extension plate.

According to a further aspect of the present disclosure, the armrest is pivotable from the stowed position to the first deployed position by moving the first guide pin along the second curved pivot slot of the pivot plate and moving the guide pin of the extension plate along the first curved pivot slot of the pivot plate.

According to a further aspect of the present disclosure, the armrest is extendible from the first deployed position to the second deployed position by moving the first guide pin along the second curved pivot slot and by moving the second guide pin of the armrest along the guide slot of the extension plate.

According to a further aspect of the present disclosure, the seat structure includes a recess in which the armrest is stowed.

According to a further aspect of the present disclosure, the first curved pivot slot extends along an arc that extends an arc angle θ of at least 90°.

According to a further aspect of the present disclosure, the second curved pivot slot extends along an arc that extends an arc angle θ of greater than 90°.

According to a further aspect of the present disclosure, the second curved pivot slot extends along an arc that extends an arc angle θ of at least 110°.

According to another aspect of the present disclosure, an extendible armrest for a seat structure includes a pivot mechanism configured to be fixed to the seat structure. An extension mechanism is pivotally connected to the pivot mechanism. An armrest is pivotally mounted to the pivot mechanism and is extendibly mounted to the extension plate, wherein the armrest is pivotable from a stowed position to a first deployed position and extendible from the first deployed position to a second deployed position forward of the first deployed position, wherein the seat structure includes a recess in which the armrest is stowed.

According to a further aspect of the present disclosure, the pivot mechanism includes a pivot plate configured to be fixed to the seat structure and having a pivot hole and a first curved pivot slot and a second curved pivot slot, the extension mechanism includes an extension plate including a pivot pin pivotally connecting the extension plate to the pivot plate and including a guide pin supported by the extension plate and received in the first curved pivot slot, the extension plate further including a guide slot and the armrest supports a first guide pin received in the second curved pivot slot of the pivot plate and supports a second guide pin received in the guide slot of the extension plate.

According to a further aspect of the present disclosure, the armrest is pivotable from the stowed position to the first deployed position by moving the first guide pin along the second curved pivot slot of the pivot plate and moving the guide pin of the extension plate along the first curved pivot slot of the pivot plate, the armrest is extendible from the first deployed position to the second deployed position by moving the first guide pin along the second curved pivot slot and by moving the second guide pin of the armrest along the guide slot of the extension plate.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
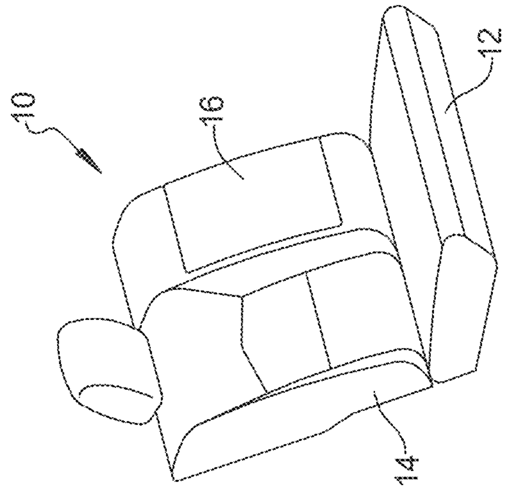
FIG. 1 is a schematic view of a vehicle rear seat with an armrest shown in a stowed position.
Figure 2:
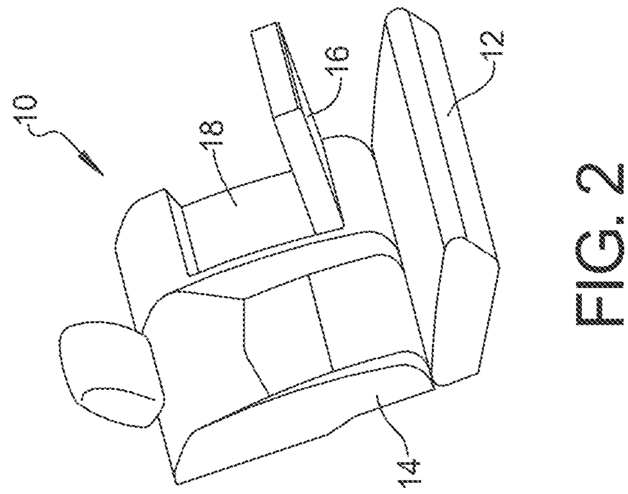
FIG. 2 is a schematic view of the vehicle rear seat with the armrest shown in a first deployed position.
Figure 3:
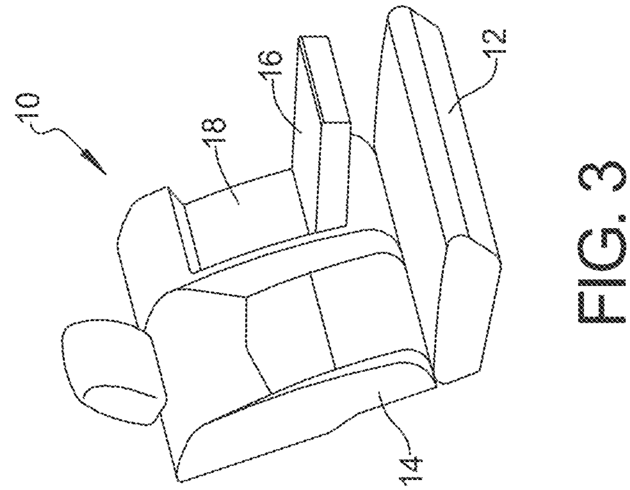
FIG. 3 is a schematic view of the vehicle rear seat with the armrest shown in a second extended deployed position.

With reference to FIGS. 1-3, a vehicle rear seat 10 is shown including a seat bottom 12 and a seatback 14. As shown in FIG. 1, an armrest 16 is stowed in a recess 18 within the seatback 14. With reference to FIG. 2, the armrest 16 is shown folded forward into a first deployed position. With reference to FIG. 3, the armrest 16 is shown extended outward away from the recess 18 into a second deployed position.

Figure 4:
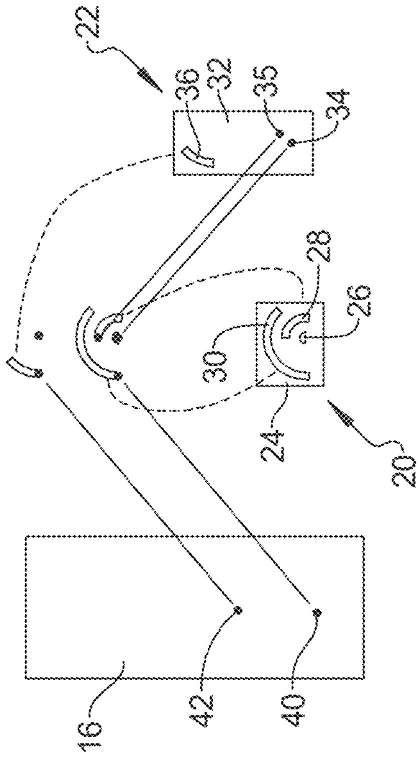
FIG. 4 is an exploded view of the components of the extendible armrest.
Figure 5:
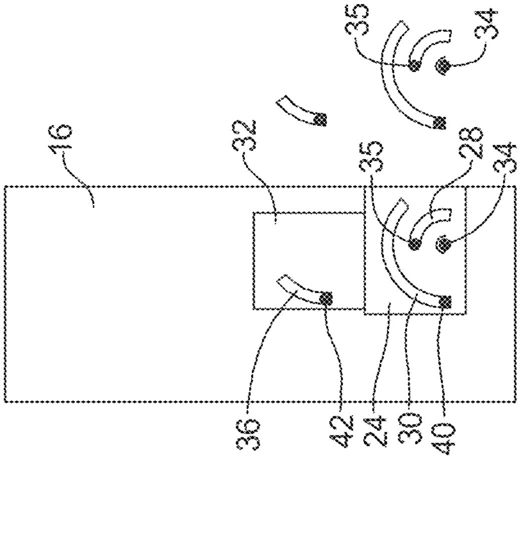
FIG. 5 is a schematic view of the armrest assembly shown in a stowed position.

With reference to FIGS. 4 and 5, the armrest 16 is shown with a pivot mechanism 20 and an extension mechanism 22. The pivot mechanism 20 includes a pivot plate 24 configured to be fixed to the seatback 14. The pivot plate 24 includes a pivot hole 26 and a first inner arc shaped pivot slot 28 and a second outer arc shaped pivot slot 30 each concentric with the pivot hole 26.

The extension mechanism 22 includes an extension plate 32 that includes a pivot pin 34 pivotally connecting the extension plate 32 to the pivot plate 24. The extension plate 32 includes a guide pin 35 supported by the extension plate 32 and received in the first inner arc shaped pivot slot 28. The extension plate 32 further includes a guide slot 36.

The armrest 16 supports a first guide pin 40 received in the second outer arc shaped pivot slot 30 of the pivot plate 24 and supporting a second guide pin 42 received in the guide slot 36 of the extension plate 32.

With reference to FIG. 5, the armrest 16 is shown in a vertical stowed position in which the armrest 16 is received in the recess 18 in the seat back 14. In the vertical stowed position, the first guide pin 40 of the armrest 16 is at a first vertically lowermost end of the second outer arc shaped pivot slot 30. The second guide pin 42 of the armrest 16 is received in a vertically lower-most end of the guide slot 36. The guide pin 35 of the extension plate 32 is received in a vertically highest end of the first inner arc shaped pivot slot 28.

Figure 6:
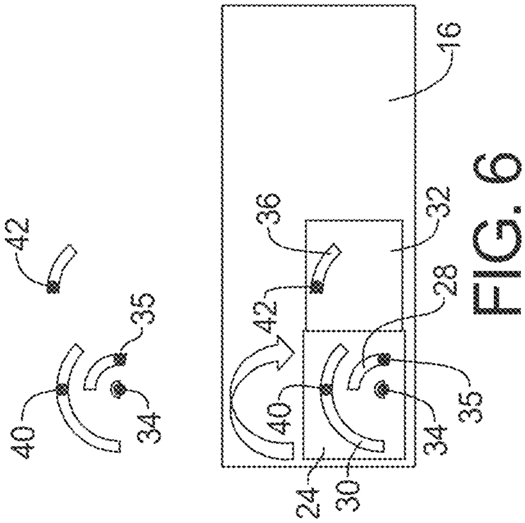
FIG. 6 is a schematic view of the armrest assembly shown in a first deployed position.

With reference to FIG. 6, the armrest 16 is shown in a first deployed position in which the armrest 16 has been pivoted generally horizontally out of the recess 18 in the seat back. In the first deployed position, the first guide pin 40 of the armrest 16 is at a first vertically uppermost portion of the second outer arc shaped pivot slot 30. The second guide pin 42 of the armrest 16 remains in the same end of the guide slot 36 as the extension plate 32 pivots along with the armrest 16. The guide pin 35 of the extension plate 32 is moved along the first inner arc shaped pivot slot 28 to a vertically lowermost portion of the first inner arc shaped pivot slot 28.

Figure 7:
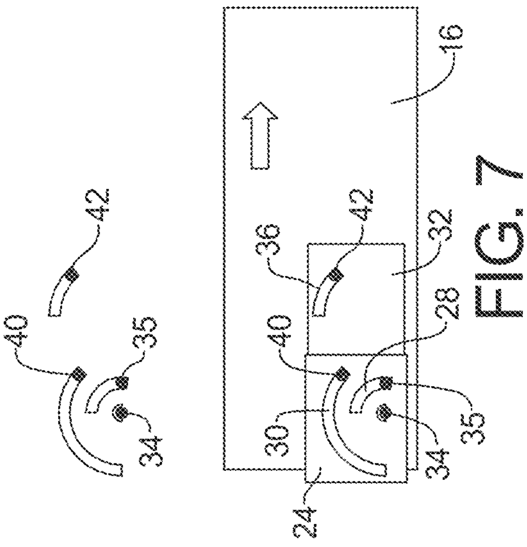
FIG. 7 is a schematic view of the armrest assembly shown in an extended second deployed position.

With reference to FIG. 7, the armrest 16 is shown in an extended second deployed position in which the armrest 16 has been moved in a horizontal direction away from the recess 18 in the seat back 14. In the second deployed position, the first guide pin 40 of the armrest 16 is at a second distal end of the second outer arc shaped pivot slot 30. The second guide pin 42 of the armrest 16 is extended to a second end of the guide slot 36 of the extension plate 32. The guide pin 35 of the extension plate 32 remains in a vertically lowermost portion of the first inner arc shaped pivot slot 28.

The armrest assembly of the present disclosure permits a folding type armrest 16 that allows the armrest 16 to move forward when unfolded so that the entire armrest surface can be utilized. The design permits the use of the extendible armrest without any modification to existing seat back designs.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. An extendible armrest for a seat structure, comprising:

a pivot plate configured to be fixed to the seat structure and having a pivot hole and a first curved pivot slot and a second curved pivot slot;

an extension plate including a pivot pin pivotally connecting the extension plate to the pivot plate and including a guide pin supported by the extension plate and received in the first curved pivot slot, the extension plate further including a guide slot; and an armrest supporting a first guide pin received in the second curved pivot slot of the pivot plate and supporting a second guide pin received in the guide slot of the extension plate.

2. The extendible armrest for a seat structure according to claim 1, wherein the armrest is pivotable from a stowed position to a first deployed position by moving the first guide pin along the second curved pivot slot of the pivot plate and moving the guide pin of the extension plate along the first curved pivot slot of the pivot plate.

3. The extendible armrest for a seat structure according to claim 2, wherein the armrest is extendible from the first deployed position to a second deployed position by moving the first guide pin along the second curved pivot slot and by moving the second guide pin of the armrest along the guide slot of the extension plate.

4. The extendible armrest for a seat structure according to claim 1, wherein the seat structure includes a recess in which the armrest is stowed.

5. The extendible armrest for a seat structure according to claim 1, wherein the first curved pivot slot extends along an arc that extends an arc angle θ of at least 90°.

6. The extendible armrest for a seat structure according to claim 1, wherein the second curved pivot slot extends along an arc that extends an arc angle θ of greater than 90°.

7. The extendible armrest for a seat structure according to claim 1, wherein the second curved pivot slot extends along an arc that extends an arc angle θ of at least 110°.

8. An extendible armrest for a seat structure, comprising:

a pivot mechanism configured to be fixed to the seat structure;

an extension mechanism pivotally connected to the pivot mechanism; and an armrest pivotally mounted to the pivot mechanism and extendibly mounted to the extension mechanism, wherein the armrest is pivotable from a stowed position to a first deployed position and extendible from the first deployed position to a second deployed position forward of the first deployed position, wherein the pivot mechanism includes a pivot plate configured to be fixed to the seat structure and having a pivot hole and a first curved pivot slot and a second curved pivot slot.

9. The extendible armrest for a seat structure according to claim 8, wherein the extension mechanism includes an extension plate including a pivot pin pivotally connecting the extension plate to the pivot plate and including a guide pin supported by the extension plate and received in the first curved pivot slot, the extension plate further including a guide slot.

10. The extendible armrest for a seat structure according to claim 9, wherein the armrest supports a first guide pin received in the second curved pivot slot of the pivot plate and supports a second guide pin received in the guide slot of the extension plate.

11. The extendible armrest for a seat structure according to claim 10, wherein the armrest is pivotable from the stowed position to the first deployed position by moving the first guide pin along the second curved pivot slot of the pivot plate and moving the guide pin of the extension plate along the first curved pivot slot of the pivot plate.

12. The extendible armrest for a seat structure according to claim 11, wherein the armrest is extendible from the first deployed position to the second deployed position by moving the first guide pin along the second curved pivot slot and by moving the second guide pin of the armrest along the guide slot of the extension plate.

13. The extendible armrest for a seat structure according to claim 8, wherein the seat structure includes a recess in which the armrest is stowed.

14. The extendible armrest for a seat structure according to claim 8, wherein the first curved pivot slot extends along an arc that extends an arc angle θ of at least 90°.

15. The extendible armrest for a seat structure according to claim 8, wherein the second curved pivot slot extends along an arc that extends an arc angle θ of greater than 90°.

16. The extendible armrest for a seat structure according to claim 8, wherein the second curved pivot slot extends along an arc that extends an arc angle θ of at least 110°.

17. An extendible armrest for a seat structure, comprising:

a pivot mechanism configured to be fixed to the seat structure;

an extension mechanism pivotally connected to the pivot mechanism; and an armrest pivotally mounted to the pivot mechanism and extendibly mounted to the extension mechanism, wherein the armrest is pivotable from a stowed position to a first deployed position and extendible from the first deployed position to a second deployed position forward of the first deployed position, wherein the seat structure includes a recess in which the armrest is stowed, wherein the pivot mechanism includes a pivot plate configured to be fixed to the seat structure and having a pivot hole and a first curved pivot slot and a second curved pivot slot, the extension mechanism includes an extension plate including a pivot pin pivotally connecting the extension plate to the pivot plate and including a guide pin supported by the extension plate and received in the first curved pivot slot, the extension plate further including a guide slot and the armrest supports a first guide pin received in the second curved pivot slot of the pivot plate and supports a second guide pin received in the guide slot of the extension plate.

18. The extendible armrest for a seat structure according to claim 17, wherein the armrest is pivotable from the stowed position to the first deployed position by moving the first guide pin along the second curved pivot slot of the pivot plate and moving the guide pin of the extension plate along the first curved pivot slot of the pivot plate, the armrest is extendible from the first deployed position to the second deployed position by moving the first guide pin along the second curved pivot slot and by moving the second guide pin of the armrest along the guide slot of the extension plate.

* * * * *